US012720232B2

(12) United States Patent
Nandan et al.

(10) Patent No.: US 12,720,232 B2
(45) Date of Patent: Aug. 25, 2026

(54) HYBRID ADDRESSING FOR IMAGING AND VISION DATA

(71) Applicant: TEXAS INSTRUMENTS INCORPORATED, Dallas, TX (US)

(72) Inventors: Niraj Nandan, Plano, TX (US); Mihir Narendra Mody, Bangalore (IN); Rajasekhar Allu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 88 days.

(21) Appl. No.: 18/960,448

(22) Filed: Nov. 26, 2024

(65) Prior Publication Data

US 2025/0088770 A1 Mar. 13, 2025

Related U.S. Application Data

(63) Continuation of application No. 18/091,798, filed on Dec. 30, 2022, now Pat. No. 12,185,007.

(60) Provisional application No. 63/391,400, filed on Jul. 22, 2022.

(51) Int. Cl.

| | |
|---|---|
| ***H04N 25/77*** | (2023.01) |
| ***H04N 23/698*** | (2023.01) |
| ***H04N 23/81*** | (2023.01) |

(52) U.S. Cl.
CPC .................................. *H04N 25/77* (2023.01)

(58) Field of Classification Search
CPC ...... H04N 25/77; H04N 23/698; H04N 23/81; G06F 13/1673
See application file for complete search history.

(56) References Cited

U.S. PATENT DOCUMENTS

| | | | | |
|---|---|---|---|---|
| 10,657,617 | B1 * | 5/2020 | Wang | G06T 7/73 |
| 10,747,692 | B2 | 8/2020 | Mody et al. | |
| 11,170,464 | B2 | 11/2021 | Nandan et al. | |
| 11,295,151 | B2 * | 4/2022 | Naidu | G06V 10/70 |
| 11,537,299 | B2 | 12/2022 | Mody et al. | |
| 11,650,923 | B2 * | 5/2023 | Kumar | H04N 21/232 |
| 12,185,007 | B2 * | 12/2024 | Nandan | H04N 25/77 |
| 2019/0278707 | A1 | 9/2019 | Li et al. | |
| 2020/0167887 | A1 | 5/2020 | Wang et al. | |
| 2021/0034899 | A1 | 2/2021 | Naidu | |
| 2021/0295607 | A1 * | 9/2021 | Cui | G06T 19/20 |
| 2022/0058768 | A1 | 2/2022 | Nandan et al. | |

* cited by examiner

*Primary Examiner* — Marly S Camargo
(74) *Attorney, Agent, or Firm* — Michelle F. Murray; Frank D. Cimino

(57) ABSTRACT

In an example, a method includes receiving image data of an input image having lines therein. The method also includes storing a first portion of the image data in a circular buffer in a first memory, wherein the first portion begins at a circular buffer start line in the input image and ends at a circular buffer end line in the input image. The method includes storing a second portion of the image data in a linear buffer in a second memory, where the second portion is non-overlapping with the first portion. The method includes processing the second portion of the image data to produce a first block of an output image. The method includes processing the first portion of the image data to produce a second block of the output image.

20 Claims, 10 Drawing Sheets

HYBRID ADDRESSING FOR IMAGING AND VISION DATA

CROSS-REFERENCE TO RELATED APPLICATION

This application is a continuation of and claims priority to U.S. patent application Ser. No. 18/091,798, filed Dec. 30, 2022, which claims priority to U.S. Patent Application No. 63/391,400, filed Jul. 22, 2022, each of which is hereby incorporated herein by reference in its entirety.

BACKGROUND

An image sensor converts light into a digital signal, which may be used to represent an image. However, the image sensor output is in a format not suitable to be consumed directly by humans or machines. For example, the image sensor output may have many defects that must be corrected to make the image visually appealing or compatible with computer vision or deep-learning systems. This is achieved by an Image Signal Processor (ISP).

SUMMARY

In accordance with at least one example of the description, a method includes receiving image data of an input image having lines therein. The method includes determining a start line for circular addressing of a first portion of the image data. The method also includes determining an end line for circular addressing of the first portion of the image data. The method includes determining a start line and an end line for a second portion of the image data, where the second portion is non-overlapping with the first portion. The method also includes storing the second portion of the image data in a linear buffer in a first memory. The method includes storing the first portion of the image data in a circular buffer in a second memory. The method also includes processing the second portion of the image data to produce a first block of an output image. The method includes processing the first portion of the image data to produce a second block of the output image.

In accordance with at least one example of the description, a method includes receiving image data of an input image having lines therein. The method also includes storing a first portion of the image data in a circular buffer in a first memory, wherein the first portion begins at a circular buffer start line in the input image and ends at a circular buffer end line in the input image. The method includes storing a second portion of the image data in a linear buffer in a second memory, where the second portion is non-overlapping with the first portion. The method includes processing the second portion of the image data to produce a first block of an output image. The method includes processing the first portion of the image data to produce a second block of the output image.

In accordance with at least one example of the description, a system includes a vision imaging subsystem configured to receive image data of an input image having lines therein. The system includes processing circuitry configured to determine a start line for circular addressing of a first portion of the image data. The processing circuitry is also configured to determine an end line for circular addressing of the first portion of the image data. The processing circuitry is configured to determine a start line and an end line for a second portion of the image data, where the second portion is non-overlapping with the first portion. The system includes a first memory configured to store the second portion of the image data in a linear buffer. The system also includes a second memory configured to store the first portion of the image data in a circular buffer. The processing circuitry is further configured to process the second portion of the image data to produce a first block of an output image. The processing circuitry is further configured to process the first portion of the image data to produce a second block of the output image.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
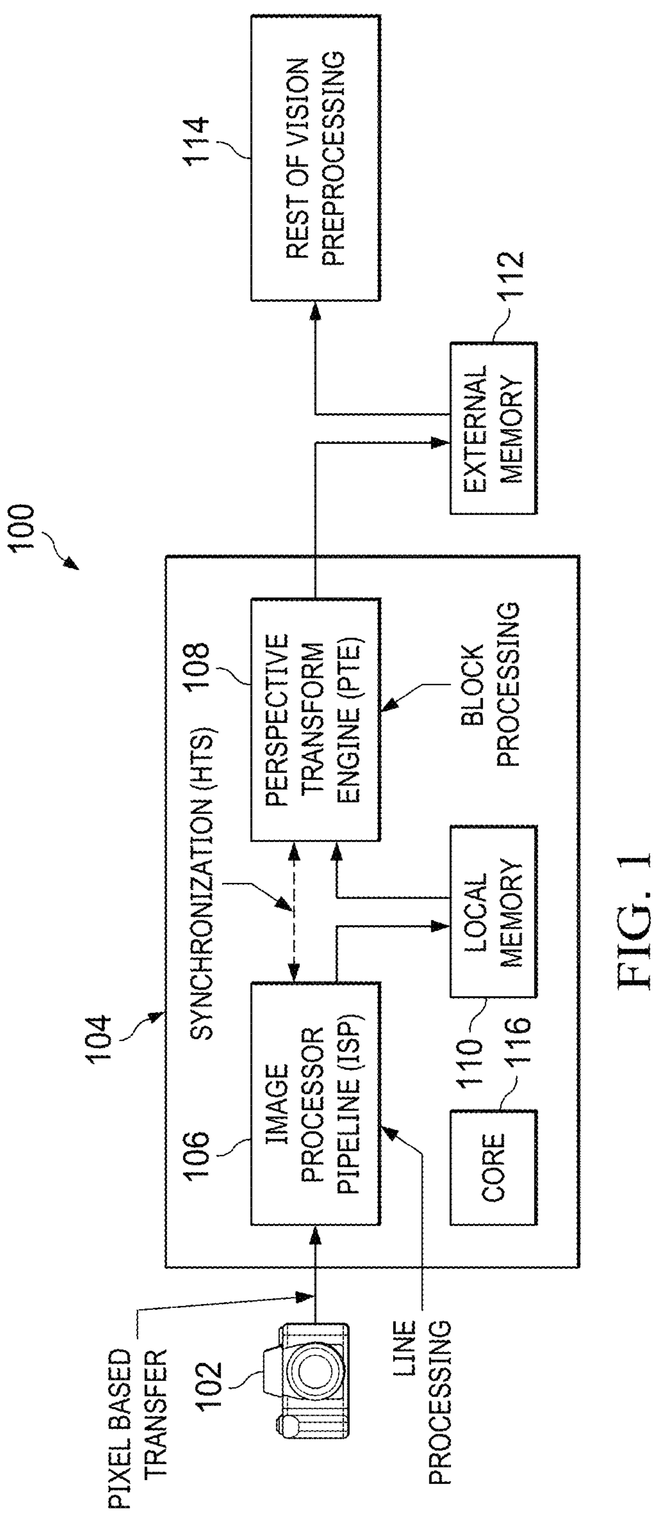
FIG. 1 is a block diagram of a portion of an image processing system in accordance with various examples.

In imaging processing systems, image data captured by a sensor may be transmitted to an image processing pipeline in raster order (e.g., line-by-line where a sequence of image pixels increments along a single dimension of an array until the end of a line in the dimension is reached). A variety of processing steps are performed on the image data to make the image suitable for viewing. The lines of the image data may be sent from left to right, and top to bottom. The image data may be processed in a first part of the image processing pipeline line-by-line. At a subsequent circuit in the pipeline, such as a remapping engine component (e.g., a lens distortion correction (LDC) or Perspective Transform Engine (PTE) or Geometric Correction Engine (GCE)), the image data may be backward mapped and processed block-by-block (e.g., in two-dimensional groups of image pixels), rather than line-by-line using one-dimensional groups of image pixels. In other words, the image data may be stored in an arrangement that is different from the arrangement in which it is used. For simplicity, some alternative remapping techniques store the entire input image in a memory prior to performing subsequent processing. However, if the image data is stored in an external memory, such as double data rate (DDR) memory, the remapping engine continually fetches data from the external memory, which causes high memory bandwidth costs.

Techniques exist to use other memories such as an on-chip buffer as image data may be retrieved more quickly from the on-chip buffer. However, the use of an on-chip buffer for storing image data is difficult because on-chip buffers are often small and may need to be filled fully when used. For example, for remapping operations such as perspective transformation and/or lens distortion correction, depending on image size, lens properties, user view, block sizes, and other parameters, the memory utilization (and hence on-chip buffer needs) for the operation varies. It is entirely possible that the memory utilization for a remapping operation may exceed an on-chip buffer so that the on-chip buffer alone is not feasible for a use case or specific application. That is, if the size of the image data is greater than the size of the on-chip buffer, the image data may not be able to be stored in the on-chip buffer.

In examples herein, a hybrid addressing approach is described where some image data is stored in an on-chip buffer for image processing, while the rest of the image data is stored in external memory (such as DDR) for processing. The image data is analyzed and a portion of the image data is selected to be stored in the on-chip buffer for processing, which may be a circular buffer that uses circular addressing. A circular buffer is a data structure that uses a fixed size buffer as if it were connected end-to-end. This portion of the image data may also be stored in the external memory as well. The rest of the image data is stored in one or more linear buffers of the external memory but not in the on-chip buffer. In some examples, the center portion of the captured image is processed using the on-chip buffer, while the top and/or bottom of the image is stored in external memory. A start line and end line of image data to be stored in the circular buffer is determined based at least in part on the size of the circular buffer. In some examples, the circular buffer is on-chip and the linear buffers are off chip. However, in other examples, all buffers may be on-chip or all buffers may be off-chip. In some examples, luma (e.g., brightness) and chroma (e.g., color) data for an image may be stored separately and independently processed according to the examples herein. In some examples, external memory bandwidth use is reduced by storing a portion of the image data in the circular buffer, which produces faster image data processing and reduces delays in the processing pipeline.

FIG. 1 is a block diagram of a portion of an image processing system 100 in accordance with various examples herein. System 100 includes a camera 102 with an image sensor, an image processing chip 104, an image processor pipeline 106, a perspective transform engine (PTE) 108, local memory 110, external memory 112, additional vision preprocessing circuitry 114, and processor core 116. In this example, image processing chip 104 includes image processor pipeline 106, PTE 108, and local memory 110, but those components may be located on different chips or have a different structure in other examples. Similarly, vision processing circuitry 114 is illustrated as being located on a separate chip from image processor pipeline 106, PTE 108, and local memory 110, but different combinations of these circuits may be co-located in other examples.

In this example, local memory 110 may include a circular buffer, and external memory 112 may include one or more linear buffers. In another example, local memory 110 may be tightly coupled with low latency to ISP 106 and PTE 108 within the sub-system, or it may be loosely connected with high latency to ISP 106 and PTE 108.

In an example, the image sensor in camera 102 sends image data in line raster order to image processor pipeline 106, which may be a pixel-based transfer. The image sensor produces input image data having input lines therein. In an example, image processor pipeline 106 performs image processing on pixels of the image data in raster order from top to bottom, and the output is provided line by line. In this example, some image data is transmitted to local memory 110 for processing in a circular buffer as described herein. Other image data may be transmitted to PTE 108, and then stored in external memory 112. A hardware thread schedule (HTS) (not shown in FIG. 1) may synchronize operations in chip 104. PTE 108 may perform backward mapping and block-based operations on the image data. One or more image processing steps may be handled block-by-block in PTE 108 in some examples. Additional vision preprocessing 114 may be performed, such as multi-scalar processing. These operations may be forward mapped in some examples.

In examples herein, and described below, the image data from the image sensor is analyzed and a portion of the data is transmitted to local memory 110 for storage in a circular buffer. Other image data may be stored in linear buffers in external memory 112. The use of local memory 110 during image processing is maximized to reduce the amount of data transmitted to and from external memory 112. In examples herein, any size of local memory may be useful, as the amount of image data stored in local memory 110 will be selected based on the size of local memory 110. A processor core 116 (e.g., central processing unit (CPU), microcontroller (MCU), digital signal processor (DSP), or controller) within the image processing chip 104 may execute software to configure the remainder of the chip 104 (e.g., ISP 106, PTE 108, etc.) to perform processing on the image data.

Figure 2A:
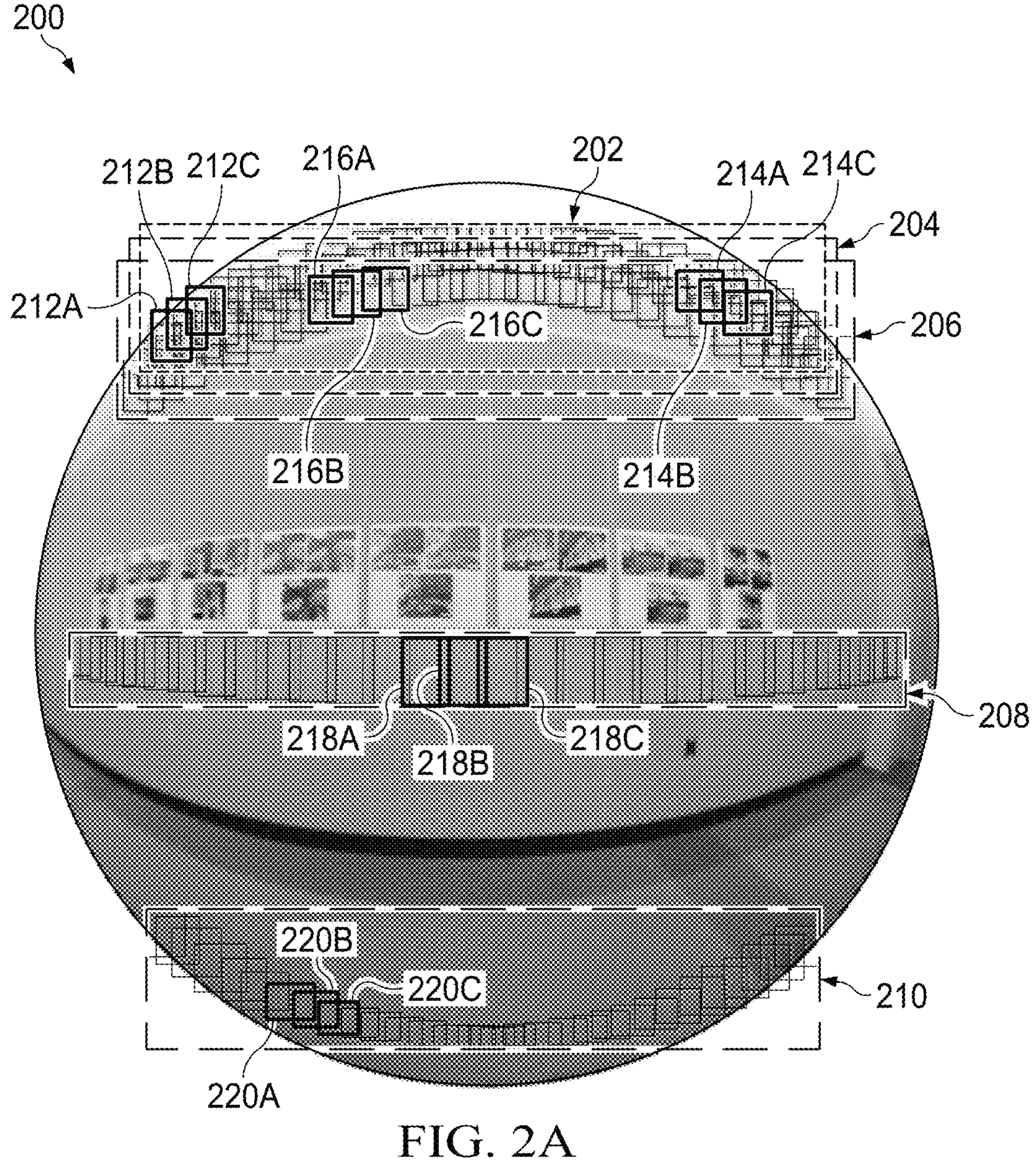
FIG. 2A is an image produced by a vision image subsystem in accordance with various examples.
Figure 2B:
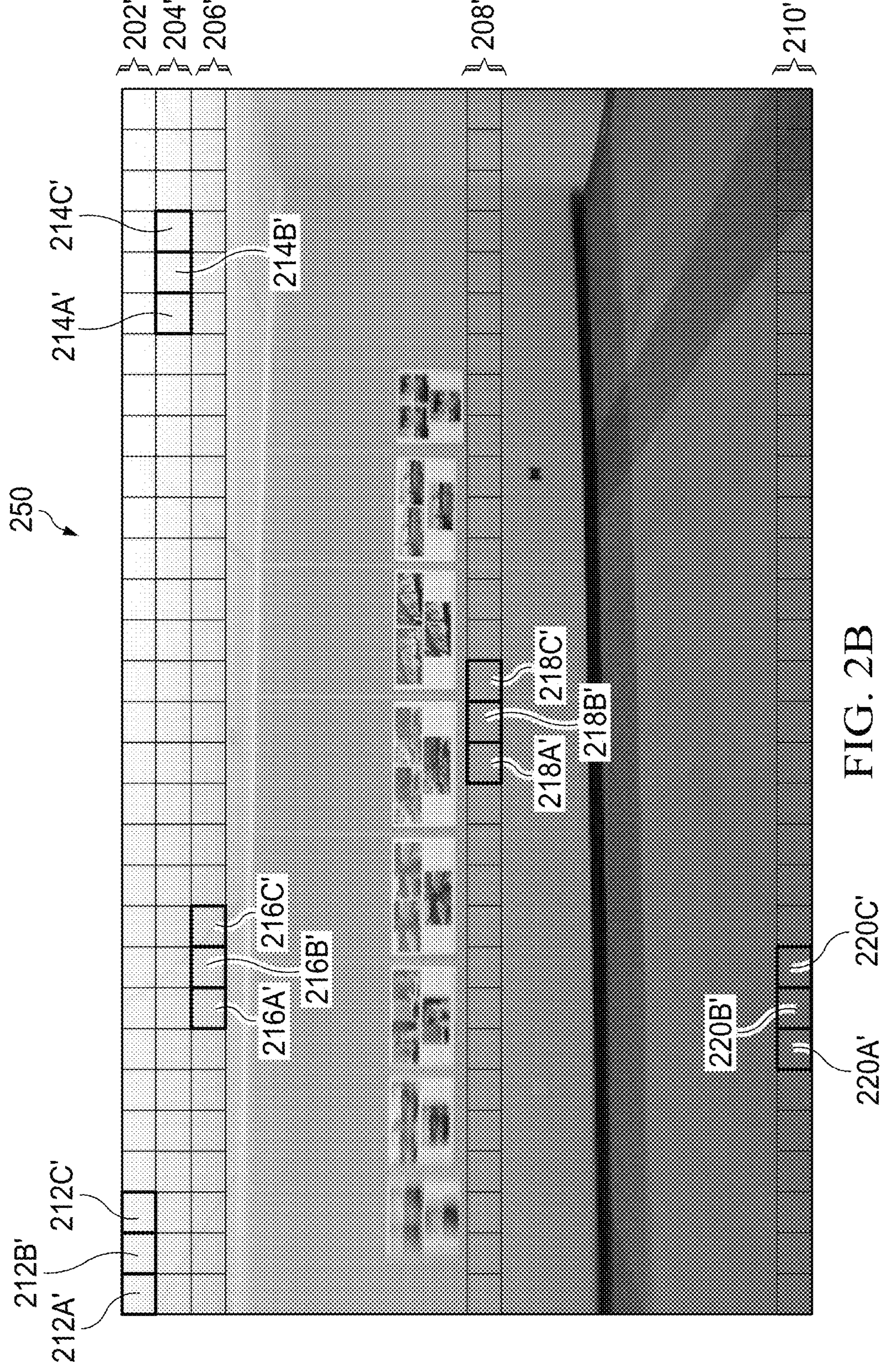
FIG. 2B is a block-by-block image produced by a remapping engine in accordance with various examples.

FIG. 2A is an example image 200 produced by a vision image subsystem in accordance with various examples herein. Image 200 may be an input to a process performed by the vision image subsystem such as a lens (e.g., fisheye) distortion correction process. FIG. 2B is an example block-by-block image 250 produced by a remapping engine in accordance with various examples herein. Image 250 may by an output of the process performed by the vision imaging subsystem on image 200. Various blocks of image data are shown and labelled in FIGS. 2A and 2B. In FIG. 2A, input boxes 202, 204, and 206 are shown as rectangles at the top of image 200. These boxes each contain a number of blocks that contain image data. Each box of the input image 200 contains a sufficient pixel data to produce a row of blocks in the output image 250. The input boxes may be different sizes and may overlap, and the blocks within the boxes may also be different sizes and may also overlap. Blocks 212A, 212B, and 212C are shown for box 202 on the left side of box 202. The other blocks that make up box 202 are not labeled for simplicity. Blocks 214A, 214B, and 214C are shown for box 204 on the right side of box 204. Blocks 216A, 216B, and 216C are shown for box 206. Near the center of image 200, box 208 includes blocks 218A, 218B, and 218C. Near the bottom of image 200, box 210 includes blocks 220A, 220B, and 220C. In this example, boxes 202, 204, 206, and 210, near the edges of image 200, are taller than box 208, which is near the center of image 200. Therefore, the utilization of the pixels for the remapping operation is higher near the center of the image 200 (e.g., box 208) than near the edges of the image 200 (boxes 202, 204, 206, and 210).

FIG. 2B is an example block-by-block image 250 produced by a remapping engine in one example. Input boxes 202, 204, 206, 208, and 210, shown in FIG. 2A, each have corresponding output boxes shown in FIG. 2B. In image 250, these output boxes are rectangular and each have the same height and length, and as can be seen, the sizes and aspect ratios of the output boxes may vary significantly from the sizes and aspect ratios of the corresponding input boxes due to the remapping operation. In FIG. 2B, boxes and blocks that correspond to the boxes and blocks in FIG. 2A have similar reference numerals and are denoted with a prime symbol ('). For example, 212A in FIG. 2A corresponds to 212A' in FIG. 2B. Within each box (202', 204', 206', 208', and 210'), the blocks from FIG. 2A are labeled in FIG. 2B. For example, blocks 212A, 212B, and 212C, found in box 202, are shown in FIG. 2A, and blocks 212A', 212B', and 212C' are shown in FIG. 2B. The other blocks that make up the boxes in FIG. 2B are not labeled for simplicity.

To process the blocks, image data is fetched from memory as blocks are processed. As described above with respect to FIG. 2A, the utilization of the pixel is higher for box 208 near the center of the image. For example, to produce the blocks in box 202' in image 250 in FIG. 2B, the entirety of box 202 in FIG. 2A is collected. To produce the blocks in box 208' in image 250 in FIG. 2B, the entirety of box 208 in FIG. 2A is collected. Boxes 202' and 208' will each correspond to a similar area of similar shape once the distortion is corrected, but as shown in FIG. 2A, box 208 is shorter than box 202 because of the nature of the distortion in image 200. Therefore, fewer lines of image data are stored to generate box 208' in FIG. 2B than to generate box 202'. Box 208 is also smaller than boxes 204, 206, and 210 shown in FIG. 2A. Therefore, less data is needed to generate the blocks near the center of image 200 than near the edges of image 200.

In examples herein, an amount of free space in a local memory suitable for use as a circular buffer is determined through an iterative process. Then, if the entire input image data cannot fit in the circular buffer, a number of lines of image data from near the center of the image that fit within the circular buffer are selected because, in the example operation (fisheye lens distortion correction), doing so allows the greatest amount of image 250 to be calculated using only the circular buffer. Those lines may be loaded in the circular buffer for use in the remapping operation. The other lines of image data within the image are placed in linear buffers, which may be in an external memory, such as external memory 112. The top and bottom of the image would have a higher circular buffer requirement to store the data in a circular buffer, due to the lower utilization of pixel data at the top and bottom of the image. Therefore, to maximize the use of the circular buffer, image data from the center of the image is placed within the circular buffer. One example technique for determining the image data for the circular buffer is described below. The lines may be placed in the various buffers in any order. In one example, the lines are selected from the image beginning with the top line (e.g., raster order), and placed in the appropriate buffer. Therefore, the lines at the top of the image may be placed in a first linear buffer in the external memory 112, then the lines from the middle of the image may be placed in the circular buffer, and then the lines from the bottom of the image may be placed in a second linear buffer in the external memory 112. The lines may then be processed beginning with the first linear buffer, then the circular buffer, and finally the second linear buffer in one example.

Figure 3:
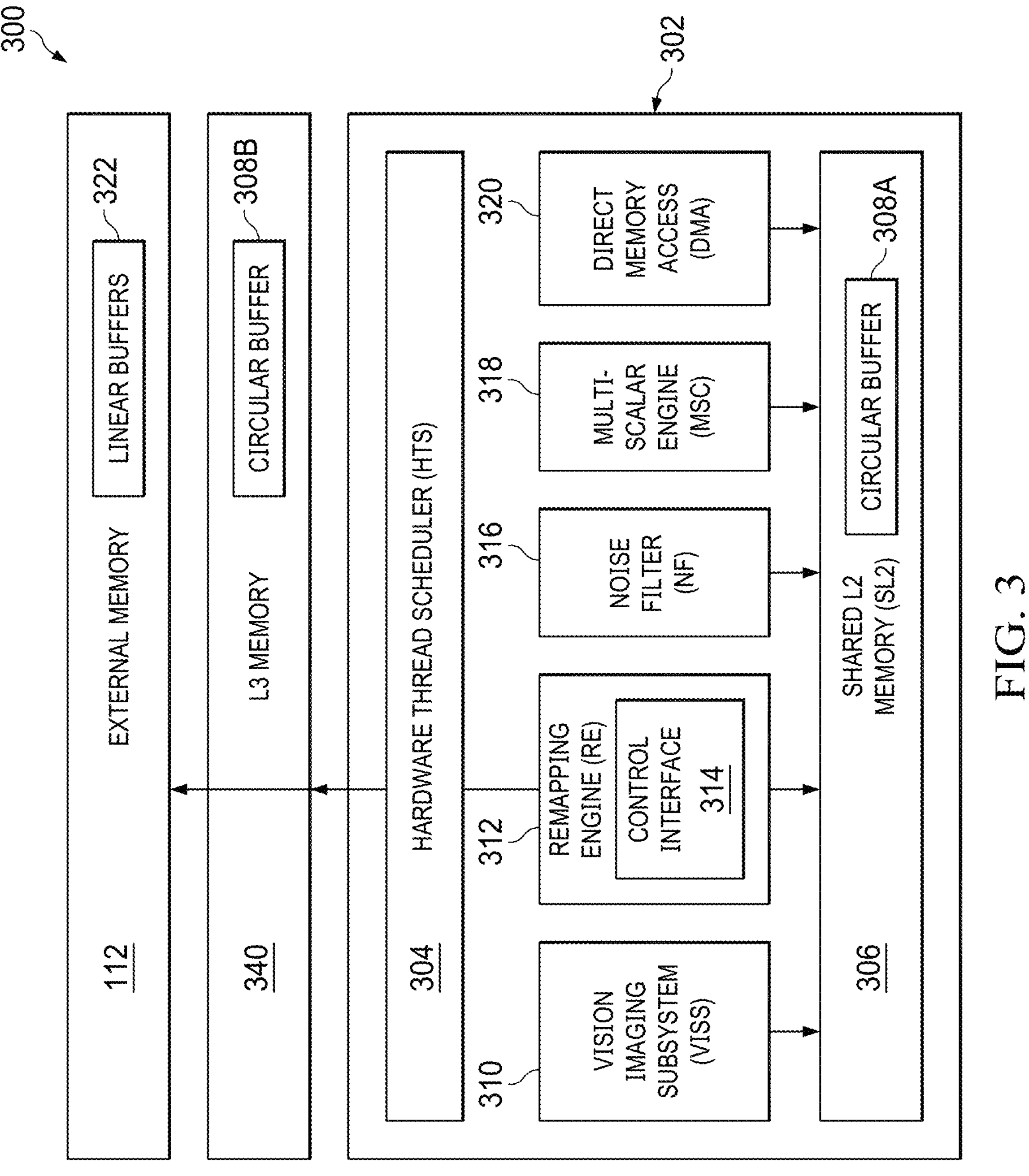
FIG. 3 is a system of hardware components for performing hybrid addressing of image data in accordance with various examples.

FIG. 3 is an example system 300 of hardware components for performing hybrid addressing of image data as described in various examples herein. The components in system 300 may be located on one chip, integrated circuit, or physical package, or in multiple chips or packages. Some components may be combined in other examples, or may be absent in some examples.

System 300 includes external memory 112 and a vision preprocessing accelerator (VPAC) 302. VPAC 302 includes a hardware thread scheduler (HTS) 304 and shared L2 memory (SL2) 306. System 300 also includes L3 memory 340, which may or may not be part of the same chip as the VPAC 302. A portion of the SL2 306 and/or the L3 memory 340 may be configured to be a circular buffer 308 (shown as 308A in SL2 306 and 308B in L3 memory 340, in one example). These circular buffers may be referred to collectively as circular buffers 308, or each individually as a circular buffer 308. In this example, circular buffer 308 is stored in on-chip memory, but may be stored in off-chip memory in other examples. System 300 also includes vision imaging subsystem (VISS) 310 and remapping engine (RE) 312. RE 312 may include a control interface 314. System 300 includes a noise filter (NF) 316, a multi-scalar engine (MSC) 318, and direct memory access (DMA) engine 320. External memory 112 may include linear buffers 322.

HTS 304 is a thread scheduler that provides scheduling and coordination of operations for system 300, such as managing channels for DMA engine 320 and communicating with RE 312. VISS 310 performs basic image raw processing in some examples, which includes wide dynamic range merge, defect pixel correction (DPC), lens shading correction (LSC), contrast enhancement (GLBCE), color conversion, and edge enhancement. VISS 310 operates on sensor data either on-the-fly or from memory. RE 312 performs image data remapping functions and applies perspective transform as well as correction of lens distortion. NF 316 performs noise filtering on images. MSC 318 may perform scaling and resizing operations. DMA engine 320 performs memory access operations.

Figure 4:
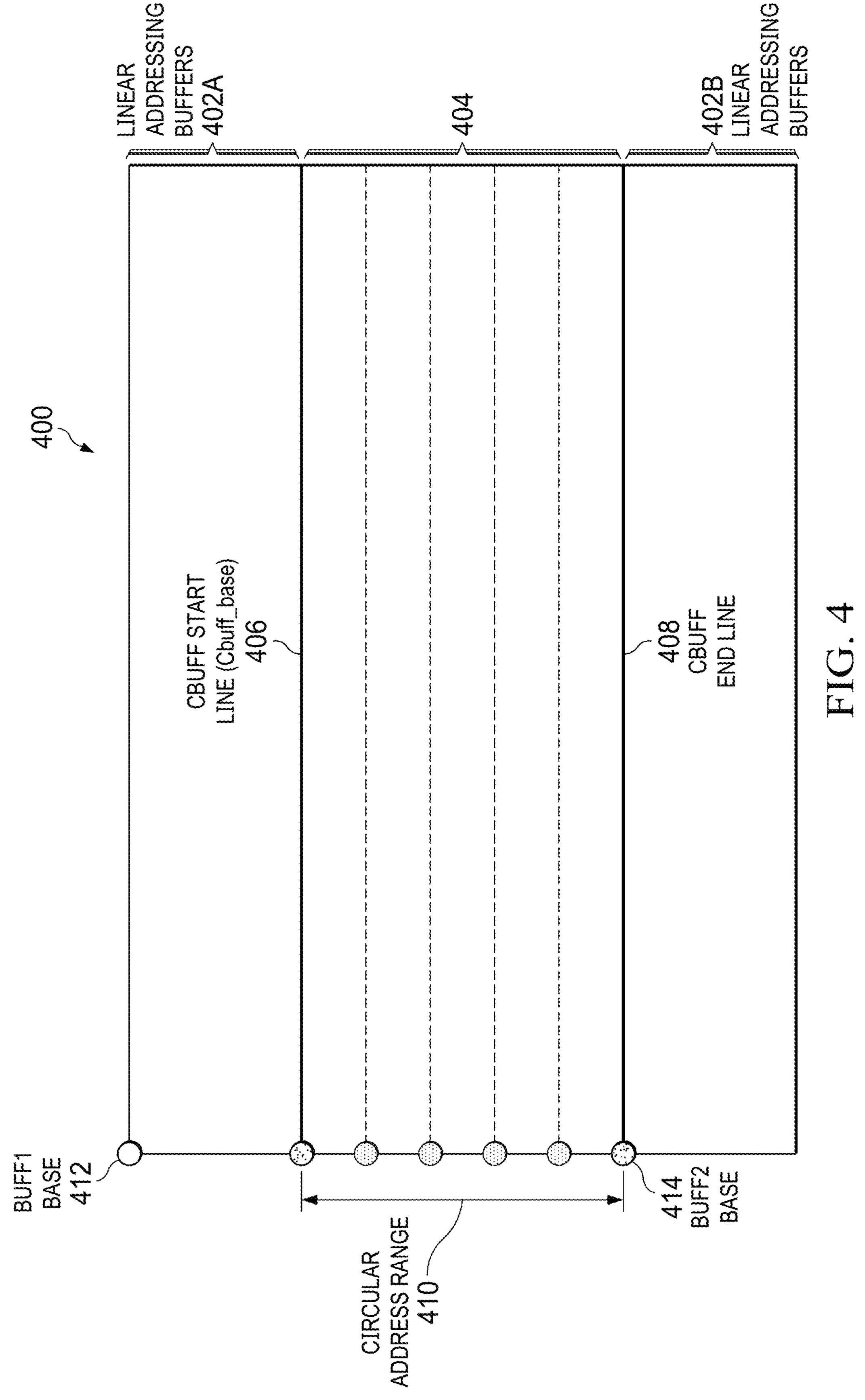
FIG. 4 shows example parameters for hybrid addressing of an image in accordance with various examples.

FIG. 4 shows example parameters for hybrid addressing of an image 400 in accordance with various examples herein. In an example, RE 312 is configured to support the combination of linear and circular addressing of the image data. Image 400 shows that two portions of image 400 are stored in linear addressing buffers 322. These portions are shown as 402A and 402B in image 400. The linear addressing buffers 322 may be in external memory 112 in an example. Portion 404 of image 400 is stored in the circular buffer 308. The circular buffer may be on-chip in an example. In this example, the center of image 400 is stored in circular buffer 308. A subsection of portion 404 may be stored in circular buffer 308 and processed, and then another subsection of portion 404 stored and processed, and so on in one example, until all of portion 404 has been processed in circular buffer 308. It is noted that in a degenerate case where most or all of an input image can be stored in the circular buffer 308 without overwriting, circular buffer 308 may be functionally identical to a linear buffer.

Various parameters may be created to support the hybrid addressing shown in image 400. The circular buffer is supported by two parameters, a Cbuff start line 406 and a Cbuff end line 408. Lines of image 400 within a window specified by these two parameters are managed using a circular buffer mechanism.

Lines outside of the circular buffer address range 410 are fetched and stored in linear addressing buffers 322. In this example, two linear buffers 322 are used for portions 402A and 402B, respectively. Lines starting at BUFF1 base 412 are stored in the first linear buffer 322, and the range for the first linear buffer 322 are the lines between BUFF1 base 412 and Cbuff start line 406. Lines starting at BUFF2 base 414 are stored in the second linear buffer 322, and the range for the second linear buffer 322 are the lines between BUFF2 base 414 and the bottom edge of image 400. As shown in FIG. 4, BUFF2 base is the next line below Cbuff end line 408. In some examples, portions 402A and 402B are different sizes, so more image data (e.g., more lines) may be stored in one of the linear buffers 322 than the other. In some examples, 402A and 402B may get stored in different portion of linear buffers 322 or into different linear buffers (similar to 322).

In some examples, there are separate luma and chroma buffers to separately store luma and chroma data for the image. The parameters described above may be independently configured for luma and chroma data.

In some examples, there may be only one linear buffer 322. If the image data in image 400 to be stored in circular buffer 308 extends to either the top or bottom of image 400, only one linear buffer 322 is needed, either above or below the image data stored in the circular buffer.

Hybrid addressing as described herein may be enabled by setting the parameters described above (Cbuff start line 406, Cbuff end line 408, BUFF1 base 412, BUFF2 base 414, and a hybrid addressing feature enable). A programmable initial and end range of the image may be stored in linear addressing buffers 322. The start line of the circular buffer 308 may be configured for both luma and chroma data. The end line of the circular buffer 308 may also be configured for both luma and chroma data. The linear buffers 322 may be stored at independent addresses and each linear buffer 322 may have a separate base address. Parameters may denote the start of the first linear buffer 322 and the start of the second linear buffer 322.

Because some image data is sent to linear buffers 322 and some to the circular buffer 308, a different DMA capability may be useful for the different buffers. For example, HTS 304 may cause DMA 320 to either load/store data into/from SL2 306. Data in SL2 306 is consumed or produced by either of VISS 310, RE 312, or other computer hardware accelerators (HWAs) in VPAC 302. For an example remapping operation, some of the lines of an input image produced by VISS 310 are stored into the on-chip circular buffer 308, and when a sufficient number of lines is accumulated in the circular buffer 308 to generate a row of output blocks, HTS 304 locks the circular buffer 308 and triggers RE 312 to perform the remapping operation on the data in the circular buffer 308. The transfer of these lines of the input image into the circular buffer 308 may be handled using different DMA channels than those lines of the input image produced by the VISS 310 which are stored into the external memory (e.g., the linear buffer). In other words, a different DMA channel may handle the circular buffer 308 data than the channel for the linear buffers. HTS 304 may trigger a particular DMA channel in an example. The HTS handles switching between channels for the different buffers. A first channel may be used for transmitting image data for the first X number of lines going to the first linear buffer 322. When line X+1 is reached, where the circular buffer 308 will begin, a second channel is triggered. The second channel may be used for the entire portion that goes to the circular buffer 308. After the last line of the circular buffer 308, a third channel may be used for transmitting image data to the second linear buffer 322, or the first channel may be reused.

As a summary of one example, VISS 310 generates a full frame of image data. The first linear buffer range, the circular buffer range, and the second linear buffer range may be given different DMA channels. The RE 312 handles the hybrid addressing scheme as described herein by fetching the appropriate input image data from the appropriate buffers. Finally, the image data is processed to create output blocks that are then sent to an additional block in the image processing pipeline and/or stored to in the external memory.

Figure 5:
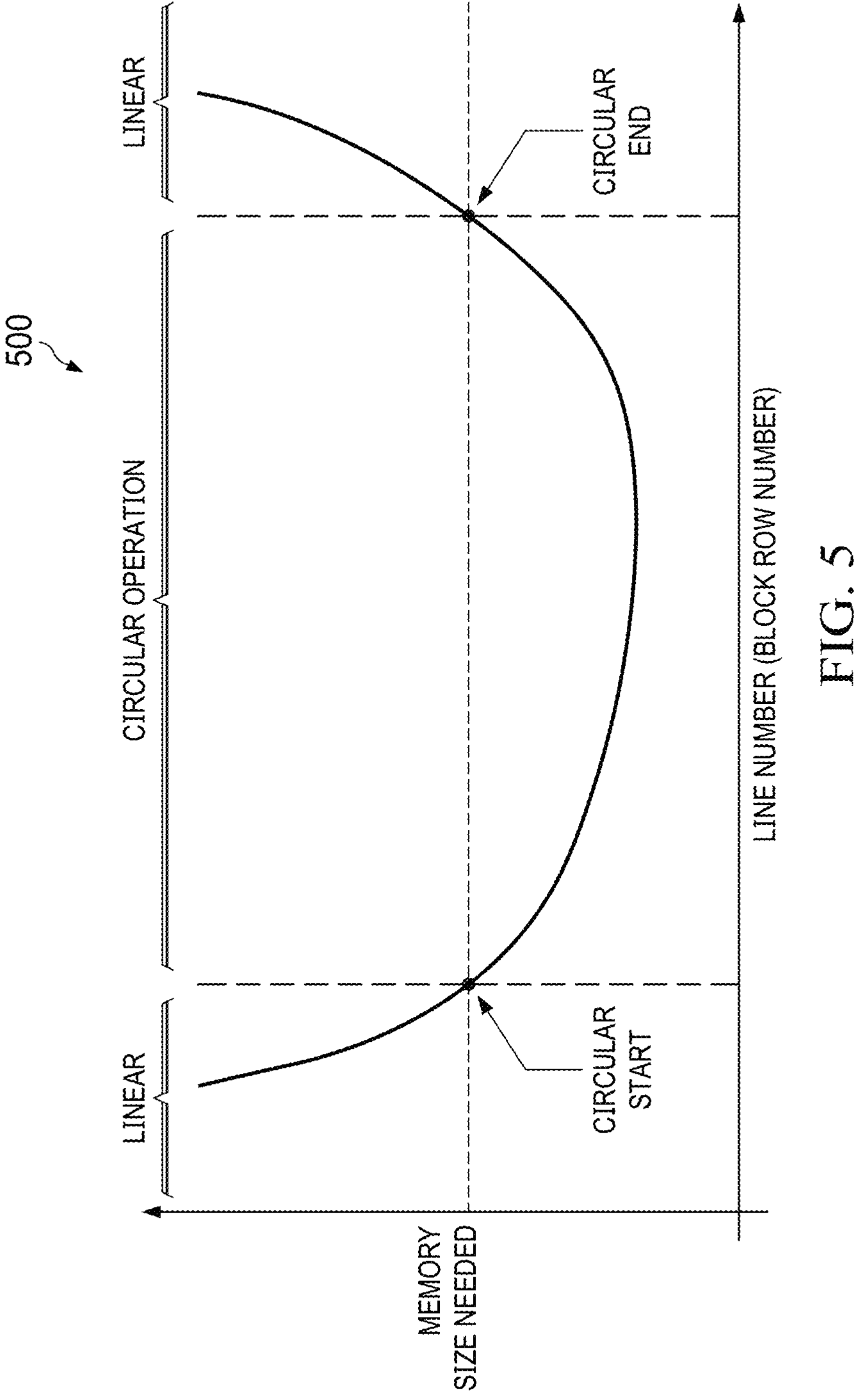
FIG. 5 is a graph of memory size for hybrid addressing in accordance with various examples.

FIG. 5 is an example graph 500 of memory size for hybrid addressing for a remapping operation in accordance with various examples herein. In graph 500, the y-axis represents the memory size needed, and the x-axis represents the line number (in terms of block row number). Graph 500 shows a linear region on the left side, a circular operation region in the center, and another linear region on the right side. Graph 500 also shows the circular buffer start point and the circular buffer end point.

As the line number on the x-axis goes from 1 to the last line, the memory size that is needed changes, as shown on the y-axis. In particular, the memory size utilized during the processing of a given row of output blocks depends on parameters of the remapping operation such as perspective scaling and the block size. In the first few lines, external memory 112 is useful because there is less benefit for using a circular buffer 308 for this image data. In the last portion of the frame, another linear buffer is used. In the center portion, the circular buffer is useful, which may be an on-chip buffer. Less memory size is needed per line for the central region, so more lines may be stored in the circular buffer 308 from the central region of the image rather than the top or bottom of the image (shown on the right and left side of graph 500). The processes described below attempt to maximize the circular buffer 308 usage based on the actual memory size with optimum block dimensions. The processes determine the start and end of the circular window (e.g., where those lines should be in the frame). The process may determine the start and end of the circular window offline, and parameters may be used by the processor core 116 to configure the relevant circuits. Additionally, or in the alternative, the process described herein may be performed in real time by software executed by the processor core 116 to find the start and end of the range for the circular buffer.

Figure 6A:
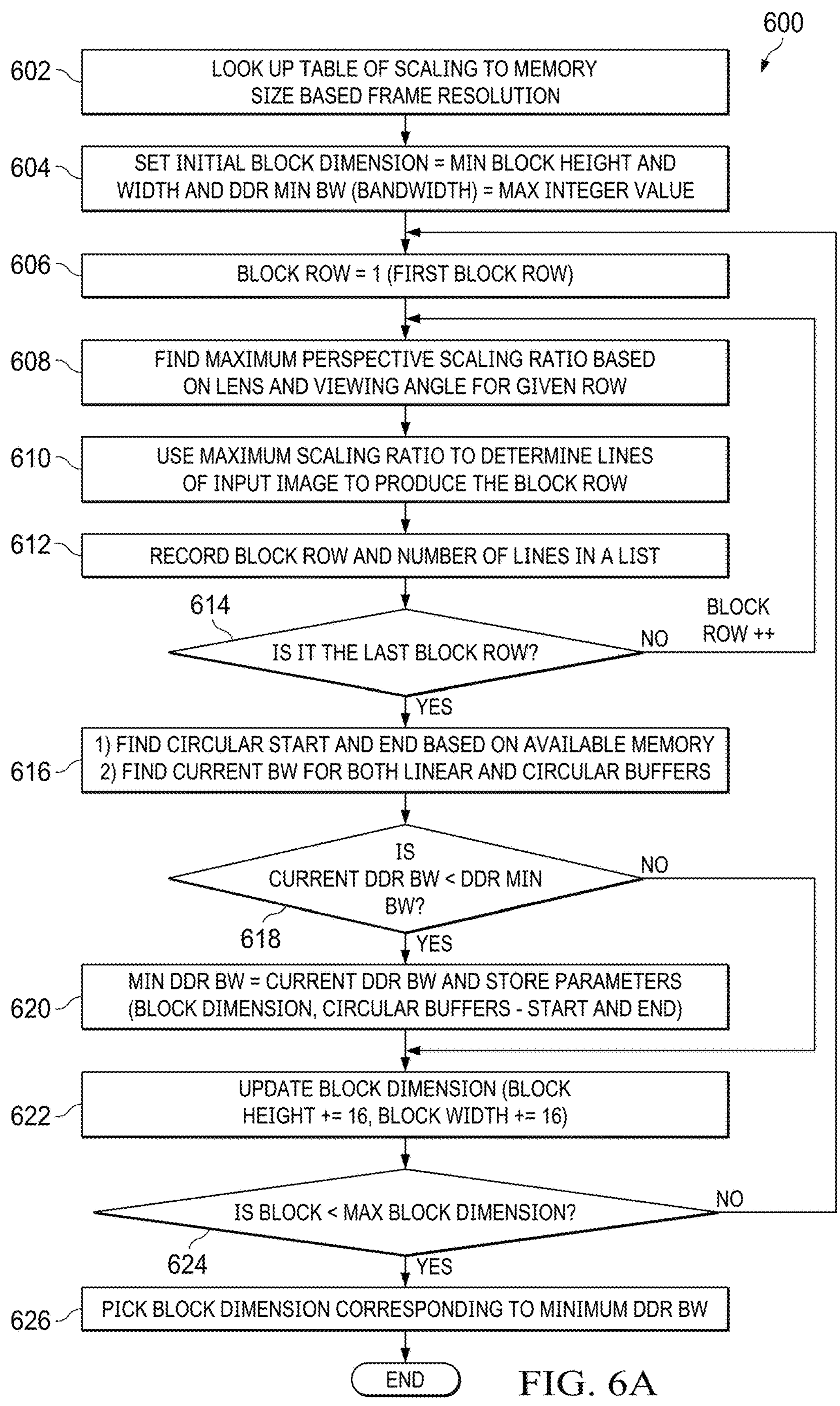
FIG. 6A is a flow diagram of a method that determines a range of lines of an input image to be stored in a circular buffer for hybrid addressing in accordance with various examples.

FIG. 6A is a flow diagram of a method 600 that determines a range of lines of an input image to be stored in a circular buffer for hybrid addressing in accordance with various examples herein. The steps of method 600 may be performed in any suitable order. The hardware components described above with respect to FIGS. 1 and 3 may perform method 600 in some examples. For example, processor core 116 may execute software instructions to perform some or all of the steps of the method 600. Additionally, or in the alternative, another computing device such as a general-purpose computer coupled to the image processing system 100 may perform some or all of the steps of the method 600. Accordingly, any suitable hardware or digital logic may perform method 600 in some examples.

In method 600, initial calculations are performed followed by a block row by block row analysis. This produces the circular start and end lines in the image data based on the size of the circular buffer. The current DDR bandwidth is also determined. External memory may be referred to as DDR in this example for simplicity, but any type of memory may be used. If the current DDR bandwidth is adequate, the process continues. If the bandwidth is not adequate, the block dimension is updated. These actions are performed to find the optimum block size. These actions could be performed before the process begins if the camera is fixed, but if the image sensor is in a camera that may be moved by a user, the block size may need to be adjusted in real time. Method 600 performs these actions as described below. In method 600, a processor or controller may perform the steps in any suitable order.

Method 600 begins at 602, where a processor or controller receives or creates a lookup table that maps scaling ratios to pixel locations of an input image. The scaling ratio (magnification or attenuation) for given pixel location is calculated based on the operation to be performed. For a lens distortion correction operation or perspective correction operation, the scaling ratios may depend on perspective (or affine) transform properties of lens as well as user viewing angle. In some examples, the look up table may contain scaling ratio of sub-sample image instead of full image to reduce look up table size.

The method 600 iterates through several possible block dimensions for the operation to determine the effect on memory utilization. Accordingly, method 600 continues at 604, where initial block dimensions are set. As possible exits for the loops of the method 600, a minimum block height and width may be set, and the DDR or external memory minimum bandwidth may be set to a maximum integer value.

Method 600 continues at 606, the block row is set to 1 (e.g., the first block row of the output image). Method 600 then proceeds to 608, where a maximum perspective scaling ratio is found for the block row based on at least a subset of the pixels therein and the lookup table. In an example, for every block in the block row being analyzed, a scaling ratio for the respective block is found based on the scaling ratios of the four corner pixels of the respective block. This process is repeated for each of the blocks in the block row to find a maximum perspective scaling ratio for the block row. This may also be used to find additional lines to be buffered for processing the block row.

Method 600 continues at 610, wherein the maximum perspective scaling ratio for the block row is used to determine which lines of an input image are used to produce the block row. In an example, a block row has a maximum perspective scaling ratio of 1.5 and a block height and block width of 16, which means that 25 lines of an input image are used to produce the block row. In turn, the number of lines can be used to determine the amount of buffer space may be used to produce the block row and to determine whether the circular buffer will suffice.

Method 600 continues at 612, where the block row and the corresponding number of lines are recorded in a list (e.g., a row consumption file).

Method 600 continues at 614, where the processor or controller determines if the block row is the last block row. If it is not, the block row is incremented and the method returns to block 608. If it is the last block row, the method proceeds to 616.

At 616, the circular start and circular end rows are found based on the available memory. As an example, if the circular buffer has space for 200 lines, then the circular start and circular end rows define those output block rows that are associated with no more than 200 lines of the input image. The circular portion is likely in the center of the image data, and includes the center row or line of the image data. The circular portion may be symmetrical about the center line or may be asymmetrical and include more lines either above or below the center line. Also, at 616, the current external memory bandwidth for any linear buffers located in the external memory and current on-chip memory bandwidth for the circular buffer are determined. In one example, a process for performing step 616 is described below with respect to FIG. 6B.

Method 600 continues at 618, where the processor or controller determines if current external memory (e.g., DDR) bandwidth is less than the DDR minimum bandwidth (a running minimum value indicating the least amount of external bandwidth consumed for the various block sizes analyzed so far). If yes, the method proceeds to 620. At 620, the minimum DDR bandwidth is set equal to the current DDR bandwidth, and the parameters are stored. The parameters include block dimension (height and width) and the circular buffer start and circular buffer end (e.g., Cbuff start line 406 and Cbuff end line 408 described above). The method then proceeds to 622.

At 618, if the processor or controller determines that current DDR bandwidth is not less than the DDR minimum bandwidth, the method proceeds to 622. At 622, the block dimension is updated by updating the block height and the block width.

Method 600 then proceeds to 624. At 624, the processor or controller determines if the block is less than the maximum block dimension. If no, the method returns to 606. If yes, the method continues to 626. At 626, the processor or controller selects a block dimension that corresponds to the minimum DDR bandwidth from the previous steps 618 or 620. Method 600 ends after 626.

The algorithm described in method 600 attempts to maximize circular buffer size (e.g., the start line and end line) based on the actual memory size for the circular buffer with maximum block dimensions (e.g., block height and width). The algorithm finds the start and end of the circular buffer window (e.g., where those lines are in the frame of image data). The algorithm may operate in real time to find the start and end of the circular buffer.

Figure 6B:
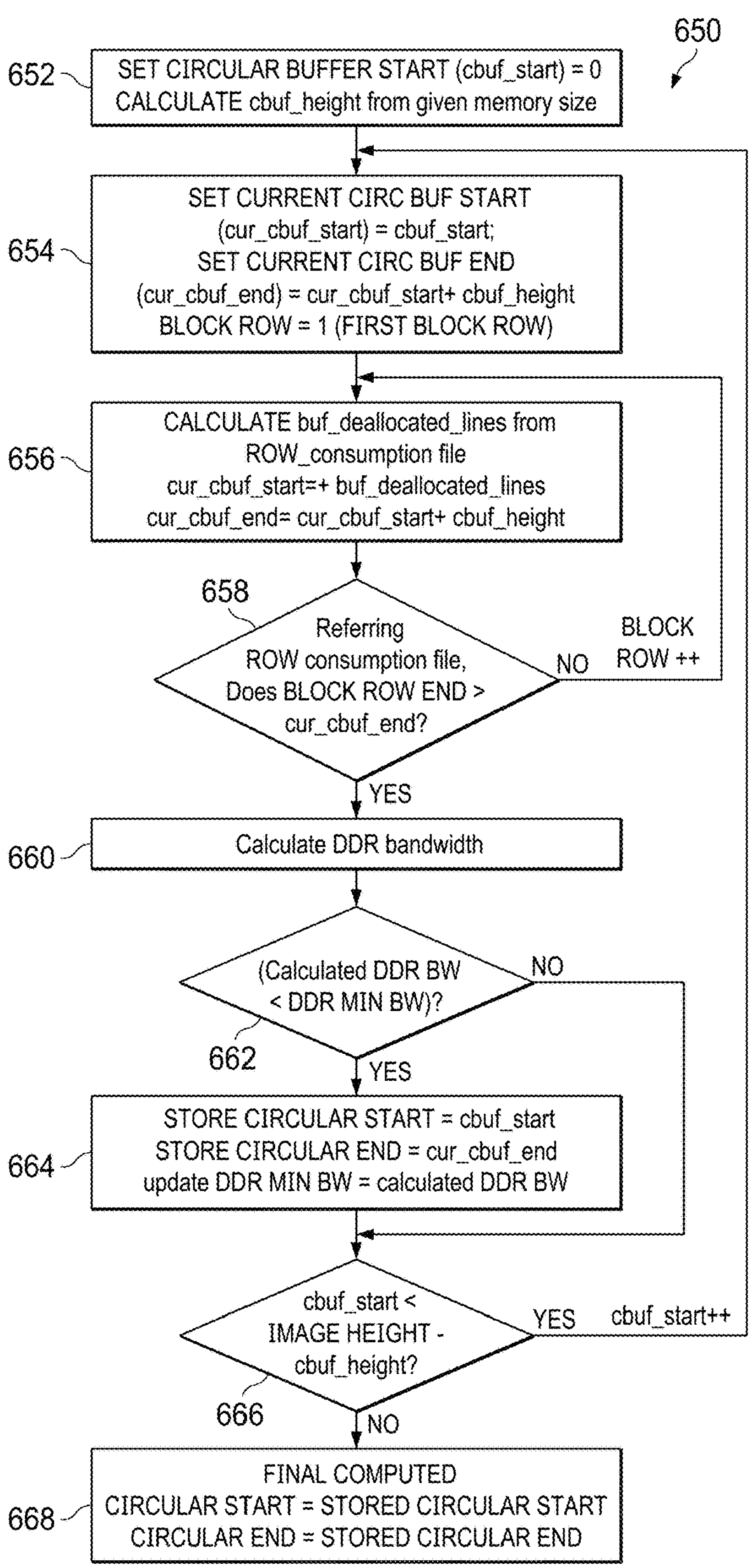
FIG. 6B is a flow diagram of a method for calculating circular buffer start and end in accordance with various examples.

FIG. 6B is a flow diagram of a method 650 for calculating circular buffer start and end in accordance with various examples herein. The steps of method 650 may be performed in any suitable order. The steps of method 650 may be performed within step 616 of method 600 in one example. The hardware components described above with respect to FIGS. 1 and 3 may perform method 650 in some examples. For example, processor core 116 may execute software instructions to perform some or all of the steps of the method 650. Additionally, or in the alternative, another computing device such as a general-purpose computer coupled to the image processing system 100 may perform some or all of the steps of the method 650. Accordingly, any suitable hardware or digital logic may perform method 650 in some examples. Other processes for calculating circular buffer start and end may be used in other examples.

Method 650 begins at 652, where a processor or controller sets a circular buffer start variable (e.g., cbut_start) to 0. Also, at 652, the height of the circular buffer (cbuf_height) is calculated from a given memory size. The height of the circular buffer is not necessarily the entire circular address range 410 from FIG. 4, but is rather the size of the circular buffer that is used for storing the image data in this example. In one example, circular address range 410 could be 400 lines, but the circular buffer height cbuf_height could be 150 lines.

Method 650 continues at 654, where the processor or controller sets the current circular buffer start (cur_cbuf_start) equal to the cbuf_start. Cbuf_start is 0 in this iteration from 652, but could be another value in a later iteration. The processor or controller also sets the current circular buffer end (cur_cbuf_end) equal to the current circular buffer start plus the circular buffer height (e.g., cur_cbuf_start+cbuf_height). As an example, if the circular buffer start is line 0, and the circular buffer height is 150, the circular buffer end line is 149. If, in a later iteration, the circular buffer start is line 150, and the circular buffer height remains at 150, the circular buffer end line is 299. Also, in 654, the BLOCK ROW is set to 1.

Method 650 continues at 656, where the processor or controller calculates the buffer deallocated lines (buf_deallocated_lines) from the row consumption file (described above with respect to 612). The cur_buff_start is changed to the buf_deallocated_lines value, and the cur_buff_end is set equal to the cur_cbuf_start plus the cbuf_height. The buf_deallocated_lines are those lines that can be removed from the circular buffer after current block row processing, as those lines are no longer required to process subsequent block rows.

Method 650 continues at 658, where the processor or controller determines whether the last line of the current row from the row consumption file goes beyond the current circular buffer end. Accordingly, the processor determines whether BLOCK ROW END>cur_cbuf_end? If no, method 650 proceeds back to 656, and increments the block row (BLOCK ROW++). The process can store more data into the circular buffer until the last line of current block row processing cannot be accommodated in the current circular buffer (e.g., if the cur_cbuf_end is larger than the last line of the current block row). Steps 656 and 658 may continue to be repeated until BLOCK ROW END>cur_cbuf_end. If BLOCK ROW END>cur_cbuf_end, method 650 proceeds to 660.

At 660, the processor or controller calculates DDR (or external memory) bandwidth. The DDR BW related to pixel fetch between circular start and circular end is set to zero due to the on-chip buffer. The DDR BW associated with the linear buffer may be calculated from a simulation model. For each block of an output image, a simulation model can create an input image bounding block, thereby getting a list of data accesses into the linear buffer mapped in DDR (and thereby DDR bandwidth), taking into account whether access falls into the linear buffer or the circular buffer, DDR burst size, maximum access constraints, etc. Method 650 then proceeds to 662.

At 662, the processor or controller determined if calculated DDR bandwidth (BW) is less than the DDR minimum bandwidth. If the calculated DDR bandwidth is less, method 650 proceeds to 664. If the calculated DDR bandwidth is not less, method proceeds instead to 666.

At 664, the processor or controller saves the cbuf_start value, e.g., 406 in FIG. 4 (store circular start=cbuf_start) and also saves the cbuf_end value, e.g., 408 in FIG. 4 (store circular end=cur_cbuf_end). Also, the updated DDR minimum bandwidth is set to the calculated DDR bandwidth. Method 650 then proceeds to 666.

At 666, the processor or controller determines whether the cbuf_start is less than the image height minus the cbuf_height. If yes, method 650 increments cbuf_start and returns to 654. Then, step 654 may begin again with an updated cbuf_start value.

At 666, if the cbuf_start is not less than the image height minus the cbuf_height, method 650 proceeds to 668. At 668, the final computed circular start is set to the stored circular start (from 664), and the final computed circular end is set to the stored circular end (from 664). At the end of all of the iterations of method 650, method 650 determines a circular start, a circular end, and the DDR bandwidth. These are the parameters found by step 616 of method 600 in FIG. 6A described above. Therefore, method 650 in FIG. 6B is one example method for performing step 616 in method 600.

Figure 7:
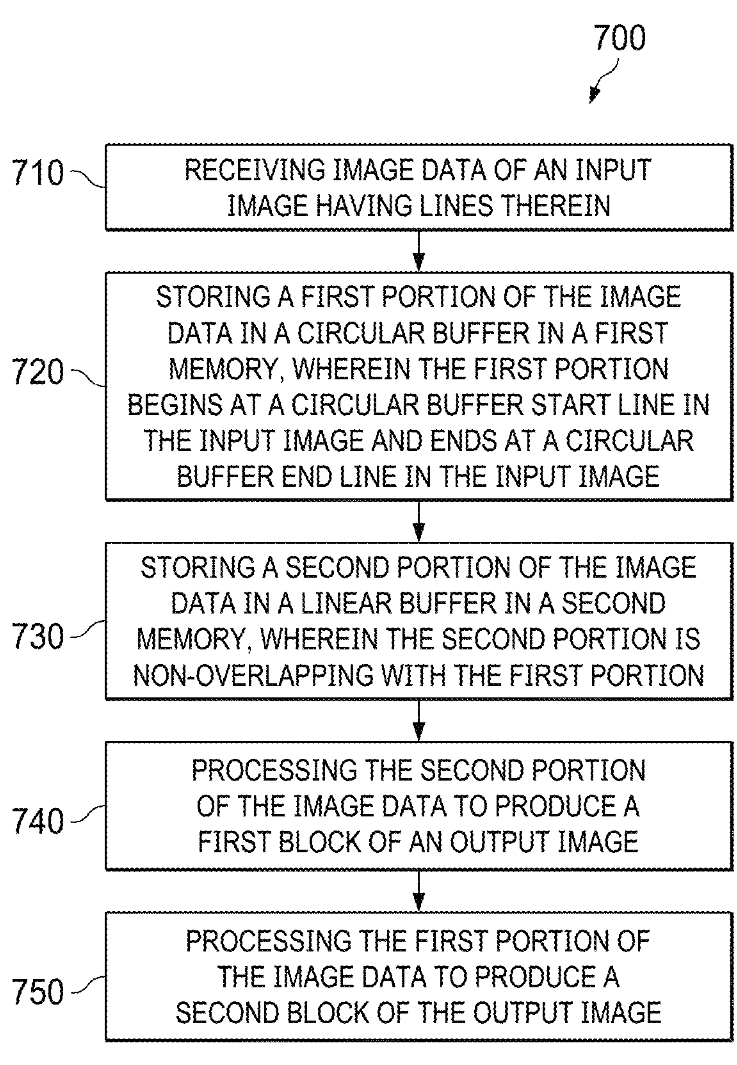
FIG. 7 is a flow diagram of a method for hybrid addressing in accordance with various examples.

FIG. 7 is a flow diagram of a method 700 for hybrid addressing in accordance with various examples herein. The steps of method 700 may be performed in any suitable order. The hardware components described above with respect to FIGS. 1 and 3 may perform method 700 in some examples. Any suitable hardware or digital logic may perform method 700 in some examples.

Method 700 begins at 710, where an image processing system receives image data of an input image having lines therein. The image data may be captured by a camera 102 with an image sensor. The image data may be transmitted in line raster order to storage, such as external memory 112. Image processing circuitry such as image processor pipeline 106 and/or VISS 310 loads this image data from external memory 112, processes the image data to remove noise, perform color conversion, and/or perform other pre-processing operations, and thereby generates an input image for a remapping operation (e.g., by remapping engine 312) line by line in raster order.

Method 700 continues at 720, where the image processing circuitry stores a first portion of the image data in a circular buffer in a first memory. The first portion begins at a circular buffer start line (e.g., a first line) in the input image and ends at a circular buffer end line (e.g., a second line) in the input image. As described herein, the first line may be Cbuff start line 406 and the second line may be Cbuff end line 408. The first portion is the portion of the image within the circular address range 410 as shown in FIG. 4. The circular buffer may be circular buffer 308, which may be on-chip or off-chip. In one example herein, the Cbuff start line 406 may be the first (e.g., top) line in the image. In another example, the Cbuff end line 408 may be the last (e.g., bottom) line in the image. In examples herein, the first portion of the image data may be stored in the circular buffer after a second portion of the image data is stored in a linear buffer. As shown in FIG. 4, a top portion of the image data is stored in a first linear buffer, a middle portion of the image data is stored in the circular buffer, and a bottom portion of the image data is stored in a second linear buffer. The image data may be stored in line raster order, beginning with the top line of the image. In that case, a second portion of the image data from BUFF1 base 412 to Cbuff start line 406 is stored first in a first linear buffer. Then, the first portion of the image data from Cbuff start line 406 to Cbuff end line 408 is stored in the first circular buffer. Finally, if any lines remain in the image, a third portion of the image data from Cbuff end line 408 to the last line in the image is stored in a second linear buffer. The stored image data may also be processed in line raster order after being stored, so the second portion would be processed first, then the first portion, and finally the third portion. The third portion may be a different size than the second portion in some examples.

Method 700 continues at 730, where the image processor pipeline 106 stores a second portion of the image data in a linear buffer in a second memory, where the second portion is non-overlapping with the first portion. As described herein, the second portion may be portion 402A in image 400. The second portion may be stored in linear buffer 322 in external memory 112. As described above, the second portion may be stored before the first portion is stored in some examples. As noted above, the steps of method 700 may be performed in any suitable order.

Method 700 continues at 740, where the second portion of the image data is processed by image processor pipeline 106 to produce a first block of an output image. Additional processing of these blocks of the output image may be performed as well.

Method 700 continues at 750, where the first portion of the image data is processed by image processor pipeline 106 to produce a second block of an output image. Additional processing of the blocks of the output image may be performed. As described above, this first portion of image data stored in the circular buffer may be processed after the second portion of image data that is stored in the first linear buffer. The image data may be processed in line raster order in one example. In this example, the first block of the output image and the second block of the output image may be processed in any order. The first block could be processed after the second block is processed. Also, the first and second blocks of the output image may be found anywhere in the output image, and the terms “first” and “second” do not indicate any specific order or location of the blocks within the output image. Multiple blocks may be produced from the second portion of the image data before the first portion of the image data is processed.

Figure 8:
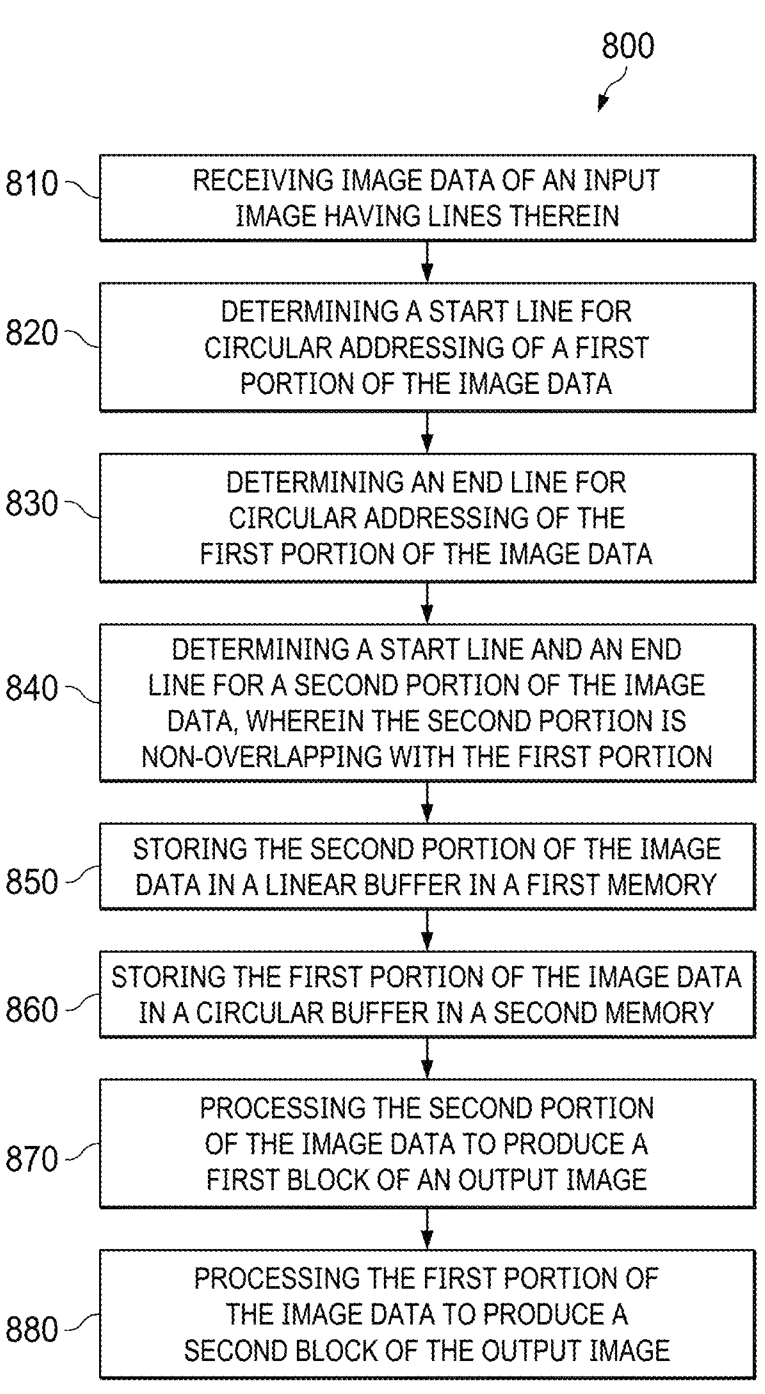
FIG. 8 is a flow diagram of a method for hybrid addressing in accordance with various examples.

FIG. 8 is a flow diagram of a method 800 for hybrid addressing in accordance with various examples herein. The steps of method 800 may be performed in any suitable order. The hardware components described above with respect to FIGS. 1 and 3 may perform method 800 in some examples. Any suitable hardware or digital logic may perform method 800 in some examples.

Method 800 begins at 810, where an image processing system receives image data of an input image having lines therein. The image data may be captured by a camera 102 with an image sensor. The image data may be transmitted in line raster order to image processor pipeline 106. In one example, a circular buffer start and end line may be found before method 800 begins.

Method 800 continues at 820, where a processing block or processing circuitry determines a start line for circular addressing of a first portion of the image data. As described herein the start line may be determined based in part on the size of the circular buffer (e.g., available memory).

Method 800 continues at 830, where a processing block or processing circuitry determines an end line for circular addressing of the first portion of the image data. As described herein the end line may be determined based in part on the size of the circular buffer (e.g., available memory). Any suitable process may be performed to determine the start line and end line.

Method 800 continues at 840, where a processing block or processing circuitry determines a start line and an end line for a second portion of the image data, where the second portion is non-overlapping with the first portion. As described herein, the second portion may be portion 402A in image 400. The second portion may also be portion 402B in image 400 in some examples. In other examples, a start line and an end line for a third portion of image data may be determined, and the third portion of image data may be stored in another linear buffer.

Method 800 continues at 850, where the image processor pipeline 106 stores the second portion of the image data in a linear buffer in a first memory. The second portion may be stored in linear buffer 322 in external memory 112 in one example. The second portion may be stored off-chip in an example. As described above, in another example a third portion may also be stored in a second linear buffer 322, as shown in FIG. 4, or in another linear buffer. As described above, the second portion may be stored before the first portion is stored in some examples.

Method 800 continues at 860, where the image processor pipeline 106 stores the first portion of the image data in a circular buffer in a second memory. The first portion begins at the start line found above and ends at the end line found above. As described herein, the start line may be Cbuff start line 406 and the end line may be Cbuff end line 408. The first portion is the portion of the image within the circular address range 410 as shown in FIG. 4. The circular buffer may be circular buffer 308, which may be on-chip or off-chip. In examples herein, the first portion of the image data may be stored in the circular buffer after a second portion of the image data is stored in a linear buffer. As noted above, the steps of method 800 may be performed in any suitable order.

Method 800 continues at 870, where the second portion of the image data is processed by image processor pipeline 106 to produce a first block of an output image. Additional processing of the blocks of the output image may be performed as well.

Method 800 continues at 880, where the first portion of the image data is processed by image processor pipeline 106 to produce a second block of the output image. Additional processing of the blocks of the output image may be performed. As described above, this first portion of image data stored in the circular buffer may be processed after the second portion of image data that is stored in the linear buffer. The image data may be processed in line raster order in one example. In this example, the first block of the output image and the second block of the output image may be processed in any order. The first block could be processed after the second block is processed. Also, the first and second blocks of the output image may be found anywhere in the output image, and the terms “first” and “second” do not indicate any specific order or location of the blocks within the output image. Multiple blocks may be produced from the second portion of the image data before the first portion of the image data is processed.

In examples herein, a dynamic mix of linear and circular address is performed on a frame of image data. External memory bandwidth may be reduced with the storage of some image data in a circular buffer. Also, the circular buffer may be used no matter how much memory is available for the circular buffer. The methods described herein determine the amount of image data to send to the circular buffer based on the size of the circular buffer. Therefore, external memory bandwidth may be reduced even if the storage space for the circular buffer is small, which may be the case in low-cost devices. The HTS allows DMA channels to be switched natively, which makes the channel switching independent of the DMA engine capability. The solution may therefore be more feasible to be adapted in various systems on a chip (SOCs). A real-time algorithm is described herein for hybrid addressing boundary calculations. In another example, DMA may be capable of performing the switching without the switching feature of the HTS.

The term “couple” is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is “configured to” perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A method, comprising:

receiving data corresponding to a set of lines of an image;

determining a first line and a second line out of the set of lines, which correspond to a first portion of the image;

determining a third line out of the set of lines, which corresponds to a second portion of the image;

storing a first subset of the data, identified based on the first line and the second line, in a first buffer; and storing a second subset of the data, identified based on at least the third line, in a second buffer, wherein the second buffer is a different type of buffer from the first buffer.

2. The method of claim 1, wherein the first portion corresponds to a center portion of the image.

3. The method of claim 1, wherein the second portion corresponds to an edge portion of the image.

4. The method of claim 1, wherein the first buffer is a circular buffer.

5. The method of claim 1, wherein the second buffer is a linear buffer.

6. The method of claim 1, wherein the first buffer is part of on-chip memory.

7. The method of claim 1, wherein the second buffer is part of off-chip memory.

8. The method of claim 1, further comprising:

obtaining the first subset of the data from the first buffer to render the first portion of the image; and obtaining the second subset of the data from the second buffer to render the second portion the image.

9. The method of claim 8, wherein obtaining the second subset of the data from the second buffer is performed prior to obtaining the first subset of the data from the first buffer.

10. The method of claim 1, further determining the first line and the second line comprises determining the first line and the second line based on a size of the first buffer.

11. A system, comprising:

a first buffer;

a second buffer that is a different type of buffer from the first buffer; and processing circuitry configured to:

receive data corresponding to a set of lines of an image;

determine a first line and a second line out of the set of lines, which correspond to a first portion of the image;

determine a third line out of the set of lines, which corresponds to a second portion of the image;

store a first subset of the data, identified based on the first line and the second line, in the first buffer; and store a second subset of the data, identified based on at least the third line, in the second buffer.

12. The system of claim 11, wherein the first portion corresponds to a center portion of the image.

13. The system of claim 11, wherein the second portion corresponds to an edge portion of the image.

14. The system of claim 11, wherein the first buffer is a circular buffer.

15. The system of claim 11, wherein the second buffer is a linear buffer.

16. The system of claim 11, wherein the first buffer is part of on-chip memory.

17. The system of claim 11, wherein the second buffer is part of off-chip memory.

18. The system of claim 11, wherein the processing circuitry is further configured to:

process the first subset of the data out of the first buffer to render the first portion of the image; and process the second subset of the data out of the second buffer to render the second portion of the image.

19. The system of claim 11, wherein the processing circuitry is further configured to:

determine the first line and the second line based on a size of the first buffer.

20. A non-transitory computer readable medium storing instructions that when executed by one or more processors cause the one or more processors to:

receive data corresponding to a set of lines of an image;

determine a first line and a second line out of the set of lines, which correspond to a first portion of the image;

determine a third line out of the set of lines, which corresponds to a second portion of the image;

store a first subset of the data, identified based on the first line and the second line, in a circular buffer; and store a second subset of the data, identified based on at least the third line, in a linear buffer.

* * * * *